(12) United States Patent
Burns et al.

(10) Patent No.: US 7,869,371 B2
(45) Date of Patent: Jan. 11, 2011

(54) METHOD AND SYSTEM FOR TESTING A CONNECTION

(75) Inventors: David Joseph Ralph Burns, Ottawa (CA); Norman James Robertson, Kanata (CA); Peter A. Palumbo, Richmond Hill (CA); Manuel Lopez Branco, Oakville (CA); Myriam Carole Boyer, Gatineau (CA)

(73) Assignee: Ixia, Calabasas, CA (US)

( * ) Notice: Subject to any disclaimer, the term of this patent is extended or adjusted under 35 U.S.C. 154(b) by 406 days.

(21) Appl. No.: 12/158,298

(22) PCT Filed: Dec. 20, 2005

(86) PCT No.: PCT/CA2005/001931

§ 371 (c)(1),
(2), (4) Date: Jun. 19, 2008

(87) PCT Pub. No.: WO2007/071002

PCT Pub. Date: Jun. 28, 2007

(65) Prior Publication Data

US 2009/0003221 A1    Jan. 1, 2009

(51) Int. Cl.
*H04L 12/26* (2006.01)
*H04L 12/28* (2006.01)

(52) U.S. Cl. .................................... 370/241; 370/250
(58) Field of Classification Search .................. 370/241, 370/250
See application file for complete search history.

(56) References Cited

U.S. PATENT DOCUMENTS 5,619,489 A    4/1997    Chang (Continued)

FOREIGN PATENT DOCUMENTS

WO    WO 02-14977    2/2002

(Continued)

OTHER PUBLICATIONS

International Search Report dated Sep. 20, 2006 in PCT/CA2006/000095 filed Jan. 25, 2006. 3 pp.

(Continued)

*Primary Examiner*—Melvin Marcelo
(74) *Attorney, Agent, or Firm*—SoCal IP Law Group LLP; Steven C. Sereboff; John E. Gunther (57) ABSTRACT

According to embodiments of the present invention an apparatus suitable for testing a connection defined between a customer entity and a network entity, the connection traversing at least a first portion of a packet-enabled network between said apparatus and the network entity is provided. The apparatus comprises a first interface adapted to exchange with the network entity data associated with the connection over a first traffic VLAN and a second interface adapted to exchange with the customer entity data associated with the connection over a second traffic VLAN bridged to the first traffic VLAN by a bridging entity. The apparatus further comprises a third interface adapted to exchange with a management entity data associated with a management connection over a management VLAN. A control module coupled to the first, second and third interfaces, the control module is provided and the control module is operable to respond to an instruction received from the management entity to cause the switching entity to perform selective bridging of the management VLAN to at least one of the first traffic VLAN and the second traffic VLAN.

58 Claims, 6 Drawing Sheets

U.S. PATENT DOCUMENTS

| | | | |
|---|---|---|---|
| 5,796,953 | A | 8/1998 | Zey |
| 5,835,565 | A | 11/1998 | Smith |
| 5,838,919 | A | 11/1998 | Schwaller et al. |
| 5,982,852 | A | 11/1999 | Schwartz |
| 6,031,528 | A | 2/2000 | Langfahl, Jr. |
| 6,212,258 | B1 | 4/2001 | Bella et al. |
| 6,278,769 | B1 | 8/2001 | Bella |
| 6,397,359 | B1 | 5/2002 | Chandra et al. |
| 6,414,958 | B1 | 7/2002 | Specht |
| 6,434,221 | B1 | 8/2002 | Chong |
| 6,473,798 | B1 | 10/2002 | Grosser et al. |
| 6,477,238 | B1 | 11/2002 | Schneider |
| 6,510,463 | B1 | 1/2003 | Farhat et al. |
| 6,574,309 | B1 | 6/2003 | Chea, Jr. |
| 6,580,727 | B1 | 6/2003 | Yim et al. |
| 6,687,335 | B1 | 2/2004 | Jones |
| 7,068,758 | B1 | 6/2006 | Wallace |
| 7,088,714 | B2 * | 8/2006 | Athreya et al. ............... 370/389 |
| 7,349,345 | B1 | 3/2008 | Hansen et al. |
| 7,606,939 | B1 * | 10/2009 | Finn ........................... 709/246 |
| 2003/0083842 | A1 | 5/2003 | Miller et al. |
| 2003/0188003 | A1 | 10/2003 | Sylvest et al. |
| 2003/0204611 | A1 | 10/2003 | McCosh et al. |
| 2003/0218984 | A1 | 11/2003 | Tanaka |
| 2004/0010627 | A1 | 1/2004 | Ellis et al. |
| 2005/0015644 | A1 | 1/2005 | Chu et al. |
| 2005/0025189 | A1 | 2/2005 | Smith |
| 2006/0227706 | A1 | 10/2006 | Burst |
| 2006/0242289 | A1 | 10/2006 | Miller |
| 2007/0121792 | A1 | 5/2007 | Chong |

FOREIGN PATENT DOCUMENTS

| | | |
|---|---|---|
| WO | WO 02-17571 | 2/2002 |
| WO | WO 2004-066601 | 8/2004 |
| WO | WO 2005-032047 | 4/2005 |

OTHER PUBLICATIONS

World Intellectual Property Organization, International Search Report for International Application No. PCT/CA2005/001931, Mail Date Apr. 13, 2006, pp. 1-3.

* cited by examiner

METHOD AND SYSTEM FOR TESTING A CONNECTION

This patent claims priority from the Patent Cooperation Treaty application number PCT/CA2005/001931 filed Dec. 20, 2005 entitled "Method and System for Testing a Connection," and published under number WO 2007/071002.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

FIELD OF THE INVENTION

The present invention relates generally to telecommunications and more particularly to a method and system for testing a connection.

BACKGROUND OF THE INVENTION

The telecommunications industry has advanced to the point where there is now a vast array of services and technologies available to consumers. As services become more sophisticated, and competition more widespread, there is a natural pressure to reduce costs and improve efficiencies in the administration of a telecommunication network. The traditional approach to troubleshooting problems associated with a customer losing, or believing to have lost, Internet connectivity was for the service provider to send a service technician to the subscriber premises. To verify Internet connectivity, the service technician would attempt to make their own Internet connection from the subscriber premises in order to assess whether a connectivity problem actually exists, and if so, to attempt to determine the nature of the problem. However, such use of service technicians, known in the industry as a truck roll, is wasteful and may engender sometimes unnecessary expenses.

Additionally, expenses for truck rolls are becoming more acute as service providers enter the realm of "triple play" services, i.e. offering voice, video and data services to customers. In particular, the introduction of the "triple play" services has triggered a move to the Gigabit Ethernet based networks (such as 1 Gigabit Ethernet networks, 10 Gigabit Ethernet networks and the like) that offer sufficient bandwidth to carry voice, video and data traffic to and from customer premises. Hence, more skilled technicians are needed to attend to potential trouble, driving costs even higher. The motivation to reduce truck rolls has therefore never been greater.

There is a solution for testing network connections described in a PCT patent application PCT/CA2004/001740 filed on Sep. 24, 2004 (and assigned to BCE Inc.) teaching a method and system for connection verification, which is incorporated in its entirety herein by reference. In particular, the application discloses provisioning of network testing using Layer 1 ("shoe") and Layer 2 (switched Private Virtual Circuits) switching of a test apparatus to the appropriate line under test. Nevertheless, there is a need for an advanced solution that would allow network tests to be remotely provisioned and conducted in a Gigabit Ethernet (GigE) based network.

SUMMARY OF THE INVENTION

According to a first broad aspect of this invention there is provided an apparatus suitable for enabling testing of a connection defined between a customer entity and a network entity. The apparatus comprises a first interface adapted to exchange with the network entity data associated with the connection over a first traffic VLAN and a second interface adapted to exchange with the customer entity data associated with the connection over a second traffic VLAN bridged to the first traffic VLAN by a bridging entity. The apparatus further comprises a third interface adapted to exchange with a management entity data associated with a management connection over a management VLAN. Also there is provided a control module coupled to the first, second and third interfaces. The control module is operable to respond to an instruction received from the management entity to cause the bridging entity to perform selective bridging of the management VLAN to at least one of the first traffic VLAN and the second traffic VLAN.

According to a second broad aspect of this invention there is provided a method for testing a customer connection defined between a customer entity and a network entity. The method can be executed at an apparatus, the apparatus connectable to at least a portion of the connection. The method comprises (i) receiving an instruction over a management VLAN, the management VLAN for exchanging with a management entity data associated with a management connection; (ii) attempting to detect within the instruction at least one of a network test instruction and a customer test instruction; (iii) responsive to detection of the network test instruction, bridging a first traffic VLAN to the management VLAN for performing at least one network test along the customer connection; and (iv) responsive to detection of the customer test instruction, bridging a second traffic VLAN to the management VLAN for performing at least one customer test along the customer connection.

According to a third broad aspect of this invention, there is provided a system. The system comprises a management entity coupled to a connection defined between a customer entity and a network entity. The system further comprises an access control entity connectable to the connection. The access control entity comprises:
  a first interface adapted to exchange with the network entity data associated with the connection over a first traffic VLAN;
  a second interface adapted to exchange with the customer entity data associated with the connection over a second traffic VLAN bridged to the first traffic VLAN by a bridging entity;
  a third interface adapted to exchange with the management entity data associated with a management connection over a management VLAN; and
  a control module coupled to the first, second and third interfaces, the control module operable to respond to an instruction received from the management entity to cause the bridging entity to perform selective bridging of the management VLAN to at least one of the first traffic VLAN or the second traffic VLAN.

According to a fourth broad aspect of this invention, there is provided a management entity suitable for testing a connection defined between a customer entity and a network entity, the connection traversing at least one access control entity. The management entity comprises a first interface adapted to exchange with at least one of the customer entity, the network entity and at least one access control entity data associated with a management connection over a management VLAN. The managing entity further comprises a control module coupled to the first interface. The control module is operable to:

generate an instruction, the instruction comprising at least one of a network test instruction and a customer test instruction;

transmit the instruction to the at least one access control entity over the management VLAN, the instruction being instrumental in causing the access control entity to selectively bridge the management VLAN to one of a first traffic VLAN and a second traffic VLAN, the first traffic VLAN for exchanging with the network entity data associated with the connection and the second traffic VLAN for exchanging with the customer entity data associated with the connection when the second traffic VLAN is bridged to the first traffic VLAN by the control module.

According to another broad aspect of this invention there is provided a method for testing a customer connection defined between a customer entity and a network entity. The method can be executed at an apparatus, the apparatus connectable to at least a portion of the connection. The method comprises (i) receiving a customer test instruction over a management VLAN, the management VLAN for exchanging with a management entity data associated with a management connection; (ii) responsive to the receiving, bridging a second traffic VLAN to the management VLAN for performing at least one customer test along the customer connection.

According to another broad aspect of this invention there is provided a method for testing a customer connection defined between a customer entity and a network entity. The method can be executed at an apparatus, the apparatus connectable to at least a portion of the connection. The method comprises (i) receiving a network test instruction over a management VLAN, the management VLAN for exchanging with a management entity data associated with a management connection; (ii) responsive to the receiving, bridging a first traffic VLAN to the management VLAN for performing at least one network test along the customer connection.

BRIEF DESCRIPTION OF THE DRAWINGS

A detailed description of specific embodiments of the invention is provided herein below, by way of example only, with reference to the accompanying drawings, in which.

In the drawings, the embodiments of the invention are illustrated by way of examples. It is to be expressly understood that the description and drawings are only for the purpose of illustration and are an aid for understanding. They are not intended to be a definition of the limits of the invention.

DETAILED DESCRIPTION OF THE EMBODIMENTS

Figure 1:
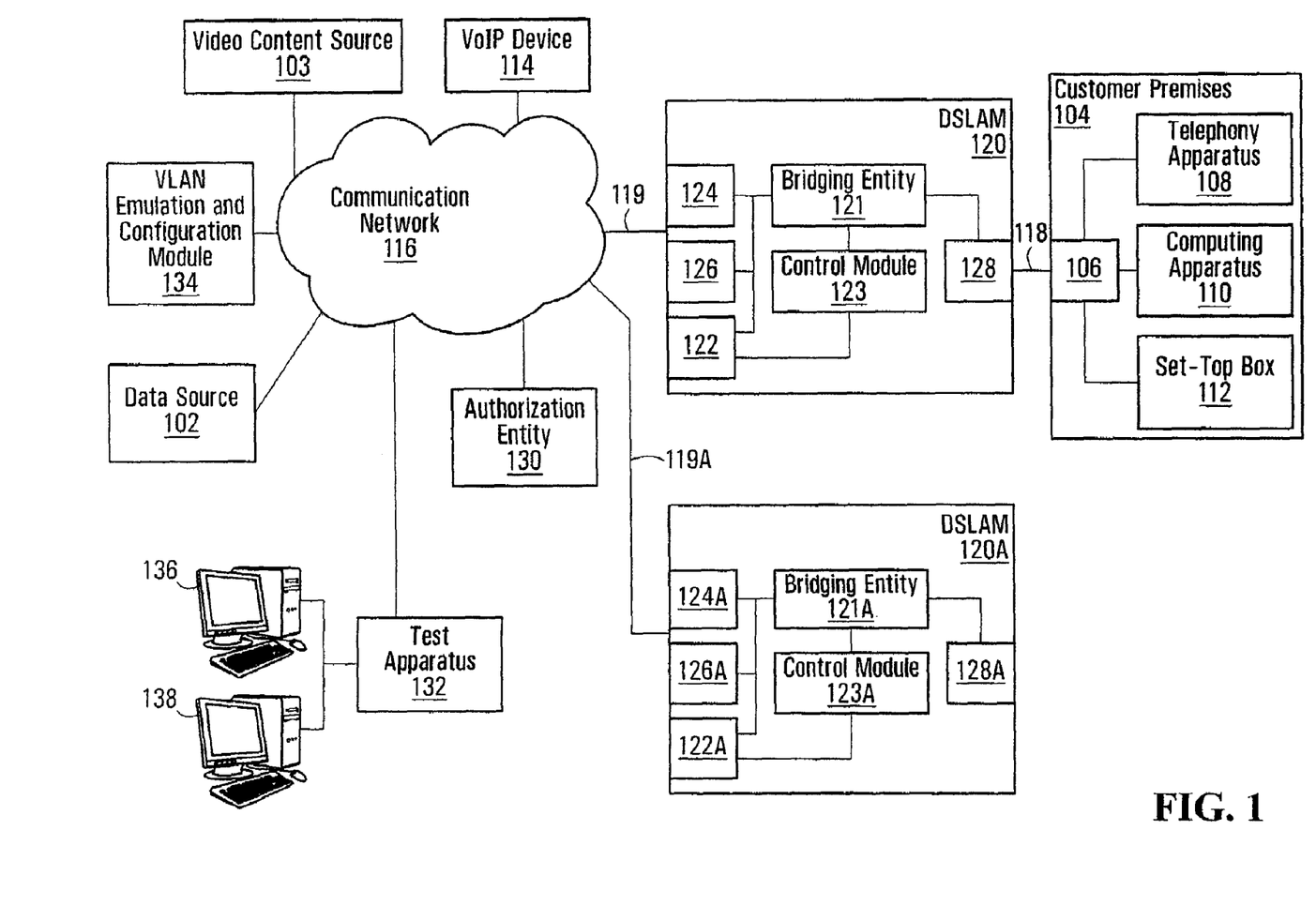
FIG. 1 is a conceptual block diagram showing various components of a system for testing network connections according to an embodiment of the present invention.

FIG. 1 depicts a network architecture comprising a plurality of entities involved in delivering a telecommunications service to a customer of a service provider, such as a telecommunication company (Telco), a cable service provider or another service provider. In one specific non-limiting example, the telecommunications service may comprise providing access to a data source 102, which in some embodiments of the present invention may be an Internet resource. In another specific non-limiting example, the telecommunication service may comprise voice-over-packet telephony. In still another case, the telecommunications service may comprise the delivery of a television signal from a video content source 103. Yet in further cases, the telecommunication service may comprise a combination of multiple services, such as a combination of the access to the data source 102, the voice-over-packet telephony and the delivery of the television signal from the video content source 103. This overall architecture is sometimes referred to as "triple play" service architecture, as it brings together access to data, voice and video from a single service provider. It should be noted that these telecommunications services are meant to serve as examples and should not be construed as limiting the invention in any respect.

At a customer premises 104, there can be provided a residential gateway 106 which can be connected to a number of appliances, such as a telephony apparatus 108, a computing apparatus 110 and a set-top box 112. The residential gateway 106 can comprise a modem, a router, a wireless router or a combination thereof. The telephony apparatus 108 can comprise a voice-over-IP (VOIP) telephone or a Plain Old Telephone System (POTS) based telephone fitted with an Analog Terminal Adapter (ATA). Any alternative device that can support voice-over-packet telephony can be used, such as a soft client or the like. The computing apparatus 110 can comprise a general purpose computer, such as a desktop or laptop personal computer. The set-top box 112 can comprise a receiver adapted for receiving and decoding packetized video. It should be understood that an in-home network may be used to interconnect the various appliances within the customer premises 104 to each other and to the residential gateway 106.

The residential gateway 106 exchanges signals with various entities (such as the data source 102, the video content source 103 and a voice-over-packet telephony device 114) over a communication network 116. The communication network 116 can comprise a public network (such as the Internet), a private network or a combination thereof. It should be noted that the communication network 116 can comprise a number of routers, access boxes, SONET add/drop mux (ADMs), optical ADMs and the like. These elements are known to those of skill in the art and have been omitted from FIG. 1 for the sake of simplicity.

The residential gateway 106 can be connected to the communication network 116 via a communication link generally depicted at 118. In the embodiment illustrated in FIG. 1, the communication link 118 can be a standard copper twisted pair cable used customarily for telephony signals, while the signal being exchanged over the communication link 118 is one which allows telephony-band signals and out-of-telephony-band signals to coexist. A non-limiting example of a general class of signals meeting these requirements is a digital subscriber line (DSL) signal. It should be understood that the nature of the communication link 118 and the format of signals being exchanged over the communication link 118 is immaterial to the present invention. For instance, in alternative embodiments, the communication link 118 can comprise a coaxial cable, an optical fiber or a wireless link to name a few. In specific examples of the wireless link, any modulation or transmission method could be used, including but not limited to code division multiple access (CDMA), 802.11, 802.16, Evolution Data Only (EvDO) and so on.

The architecture described in FIG. 1 further includes a digital subscriber line access multiplexer (DSLAM) 120, which aggregates DSL links associated with multiple customer premises 104 (such as the communication link 118) into a single high speed line 119. The DSLAM 120 may be located in a central office associated with the service provider. In this scenario, the DSLAM 120 may comprise a Stinger® FS+ DSL Access Concentrator from Lucent Technologies, 600 Mountain Avenue, Murray Hill, N.J., USA. Alternatively, the DSLAM may be located at an outside location (in these embodiments, the DSLAM 120 is typically referred to as an OPI-DSLAM or an outside plant interface DSLAM). In this scenario, the DSLAM 120 can comprise a Stinger® Compact Remote from Lucent Technologies. In some embodiments of the present invention, the DSLAM 120 can be distributed, with some components being situated in a central office and some components being situated at an outside location. It should be noted that in alternative embodiments, another type of access control entity can be used. For example, in a scenario where the communication network 116 is based on a coaxial cable distribution network, the access control entity may comprise a head-end modem. In an alternative embodiment of the communication network 116 comprising a WiMax distribution network, the access control entity can comprise a wireless transmission node.

The DSLAM 120 can have a number of ports, such as ports 122, 124, 126 and 128, as well as a number of other ports which are not depicted in FIG. 1 for the sake of simplicity. For example, port 128 can be the port used by the communication link 118 associated with the residential gateway 106. It will be appreciated by those of skill in the art that the number of ports on the DSLAM 120 will define the number of connections that the DSLAM 120 can support. At least some of the ports 122, 124, 126 and 128 can support both Virtual LAN (VLAN) connections (i.e. connections that are part of the VLAN) and Gigabit Ethernet traffic. Generally speaking, a VLAN or a "virtual" Local Area Network is defined by its members and is a protocol for interchanging information. As opposed to a physical LAN, members of a VLAN do not need to be connected to one another. For the purposes of the explanation of the instant invention, it is assumed that it is desired to use one or more VLANs. This can be so in order to benefit from one of the characteristics associated with VLANs, such as but not limited to (a) enabling transmitting subscriber traffic that traverses different virtual segments of the communication network 116; (b) increased security associated with improbability of inadvertently mixing traffic associated with different subscribers; (c) any other suitable reason.

Furthermore, at least one of the ports 122, 124, 126 and 128 is dedicated to management activities. Specifically, in the embodiment illustrated in FIG. 1, port 122 can be a dedicated management port, i.e. a port dedicated to management and/or testing activities. The nature and purpose of ports 122, 124, 126 and 128 will be discussed in greater detail below.

The DSLAM 120 includes a bridging entity 121 coupled to at least some of the ports 122, 124, 126 and 128. In a specific example depicted with reference to FIG. 1, the bridging entity 121 is coupled to all of the ports 122, 124, 126 and 128; but this need not be so in every embodiment of the present invention. In some embodiments of the present invention, the bridging entity 121 can comprise an ATM card, such as an OC3 trunk module. In some embodiments of the present invention, the OC3 trunk module can comprise two ports that are hard wired with a fiber patch therebetween. Other variants apparent to those of skill in the art can be used to implement the bridging entity 121. As will be discussed in greater detail herein below, the bridging entity 121 is operable to bridge members of different VLANs.

The DSLAM 120 further includes a control module 123, connected to the bridging entity 121 and to the management port 122. It should be noted that the control module 123 can be coupled to other components of the DSLAM 120 (such as ports 124, 126 and 128), but this has been omitted from FIG. 1 for the sake of simplicity. The control module 123 can be responsible for maintaining an internal database (such as a database 610 depicted in FIG. 6). The purpose of the database 610 will be discussed in greater detail herein below, but suffice it to say for now that the database 610 is for keeping track of which components of the DSLAM 120 are members of which VLAN. As will be discussed in greater detail herein below, the control module 123 can receive an instruction from an external source (for instance, via the management port 122) and to cause the bridging entity 121 to bridge members of different VLANs meeting at the DSLAM 120.

It should be understood, that a number of additional DSLAMs substantially similar to the DSLAM 120 can be present. For the sake of simplicity, FIG. 1 depicts only a single additional DSLAM 120a as being connected to the communication network 116 by a communication link 119a, but it should be understood that architecture depicted in FIG. 1 can have a number of other additional DSLAMs. The DSLAM 120a can be substantially similar to the DSLAM 120 and includes a number of ports 122a, 124a, 126a and 128a. One of the ports 122a, 124a, 126a and 128a can be a dedicated management port. In the embodiment depicted on FIG. 1, the port 122a is a dedicated management port, i.e. a port dedicated to management and/or testing activities. The DSLAM 120a further comprises a bridging entity 121a and a control module 123a, which can be substantially similar to the bridging entity 121 and the control module 123 respectively. Therefore, one should understand that the architecture of FIG. 1 is scalable.

It should be understood that each of the DSLAM 120 and DSLAM 120a can serve a number of customer premises, only one of which, namely the customer premises 104 connected to the DLSAM 120, is depicted in FIG. 1. One of skill in the art will appreciate that the number of customer premises 104 served by each of the DSLAM 120 and DSLAM 120a is limited only by the number of ports (such as customer-dedicated ports 128 or 128a) available at the respective DSLAMs 120 and 120a.

With further reference to FIG. 1, there is also provided a VLAN emulation and configuration module 134 connected to the communication network 116. The VLAN emulation and configuration module 134 maintains an internal database (not depicted) for storing a record for each VLAN and members that form part of each of the VLANs (referred to herein below as "members" of a particular VLAN). As the VLANs are defined or as new members are added to a specific VLAN, the control modules 123, 123a of the DSLAMs 120, 120a register the new members of a specific VLAN with the VLAN emulation and configuration module 134. The registration can be based on MAC addresses of the participating members or any other suitable identifier. The VLAN emulation and configuration module 134 can be responsible for configuration of VLANs by notifying existing and new members of a particular VLAN of an address where the VLAN emulation and configuration module 134 can be reached. The VLAN emulation and configuration module 134 can be further responsible for assigning and keeping track of VLAN identifiers (such as outer tags, inner tags or any other suitable identifiers).

It should be noted that in some embodiments of the present invention, more than one VLAN emulation and configuration module 134 can be utilized, for instance a dedicated VLAN emulation and configuration module 134 can be utilized for each separate VLAN. Other alternatives will become clear to those of skill in the art.

In the embodiment illustrated in FIG. 1, there is also provided an authorization entity 130 connected to the communication network 116. The authorization entity 130 can be embodied in a Authentication, Authorization and Accounting (AAA) server that is used for verifying user access credentials via a PPPoE session and authorizing users to access a network resource (for example, the data source 102). Alternatively, the authorization entity 130 can be embodied as an address-assigning entity, such as a Dynamic Host Configuration Protocol (DHCP) server which provides configuration parameters required by the client host (such as the computing apparatus 110) to participate on an IP-based network (such as the communication network 116). Such a DHCP server also provides a mechanism for allocation of IP addresses to client hosts. It should be understood that in a specific non-limiting example, the authorization entity 130 can combine functionality of an AAA server and an address-assigning entity.

Also connected to the communication network is a test apparatus 132. The test apparatus 132 can comprise a "test head" from Ixia of 26601 W. Agoura Rd., Calabasas, Calif., USA, such as an Ixia 1600T Chasis LM1000STXS4-256 Cards. The test head can be loaded with IxExplorer, IxAccess, IxChariot and IxLoad software also available from Ixia. The test apparatus 132 is operable to test various parameters associated with the communication network 116, as well as various parameters associated with the communication links 118, 118a and 119. Specifically, the test apparatus 132 can test various parameters associated with Layer 7 (i.e. the Application Layer) of the Open Systems Interconnection (OSI) Reference Model (hereinafter referred to as "OSI Model"), such as throughput, jitter and the like. Testing of the Application Layer parameters is typically required to ensure that the telecommunications service delivered at the customer premises 104 meets certain standards, such as the standard of service set out in a Service Level Agreement. However, it should be appreciated that testing of the Application Layer parameters may be required for a number of different reasons. It should be appreciated that the test apparatus 132 can also perform a number of other tests associated with other layers of the OSI Model, such as but not limited to metal tests (Layer 1), etc.

Connected to the test apparatus 132 can be a number of workstations 136 and 138. Workstations 136 and 138 can be staffed by customer service representatives/technicians associated with the service provider. Association between the customer service representatives/technicians and the service provider can take the form of an employment, contract or outsourcing arrangement. The customer service representatives/technicians can be contacted by someone at the customer premises 104 (i.e. a person residing or present at the customer premises 104) in case the quality of the telecommunication services is not at a certain level (for example in case of loss of connection to the communication network 116, loss of video signal from the video content source 103 or inability to make a voice-over-packet call to the voice-over-packet telephony device 114). The manner in which someone at the customer premises 104 contacts the customer service representative/technician is not particularly limiting, and as such can be achieved by a telephony connection, a data connection or any other suitable means.

By using a Graphical User Interface (GUI) presented by one of the workstations 136 and 138, the customer service representative/technician can, among other things, issue instructions to the test apparatus 132 to conduct various tests. It should be noted that workstations 136 and 138 can be located elsewhere than the test apparatus 132. Conversely, the test apparatus 132 can receive instructions from more than one location where workstations 136 and 138 are located. In other words, it should be understood that the test apparatus 132 can be remotely controllable. It should be further noted that the workstations 136 and 138 are described merely as an exemplary embodiment. In alternative embodiments of the present invention, it is envisioned that the test apparatus 132 can be controlled from the customer premises 104.

Given the architecture described above, it is possible to establish data sessions between one or more appliances located in the subscriber premise 104 via the communication network 116. It should be understood that the term "data session" as used herein is not intended to be limited to the exchange of a particular type of information, but rather is used to distinguish such a session from a "management session" as described herein below. Generally speaking, the data session can comprise one or more of an exchange of voice, video, e-mail, computer files, text messages, etc. In one specific non-limiting example, it is assumed that the data within the data session is exchanged over a number of VLANs as will be described herein below.

Figure 2:
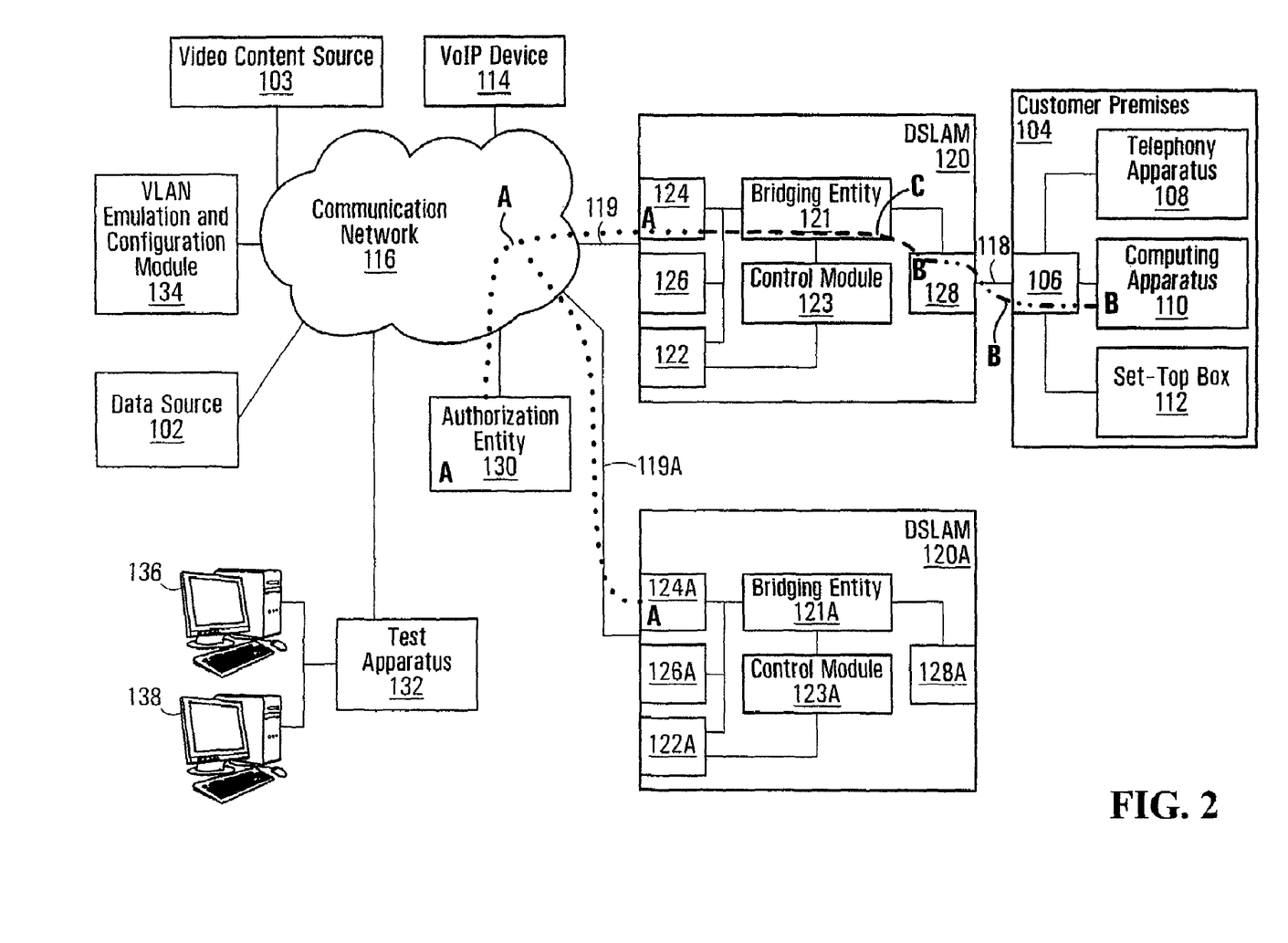
FIG. 2 is a conceptual block diagram depicting system of FIG. 1 in a "traffic mode" with a traffic VLAN defined between an appliance within customer premises and an authorization entity of FIG. 1.

With reference to FIG. 2 and for illustration purposes only, it will be assumed that it is desired to establish a data session that terminates at the computing apparatus 110. In this scenario, potential end points of the data session can comprise the data source 102 and the computing apparatus 110. For the purposes of this description it is assumed that the DSLAM 120 is operable to support Gigabit Ethernet traffic over one or more VLANs. To that extent, in one specific non-limiting example, the DSLAM 120 comprises two ports that can support Gigabit Ethernet traffic, such as ports 124 and 126. Naturally, it should be understood that the DSLAM 120 can have a number of other ports adapted to support Gigabit Ethernet traffic. In the embodiment described with reference to FIG. 2 it is assumed that port 126 is dedicated to video traffic and port 124 is dedicated to other traffic (ex. data, voice, etc.), but this need not to be so in every embodiment.

A particular VLAN can be broadly categorized as a "traffic VLAN" or as a "management VLAN". The traffic VLANs are defined to carry one or more data sessions (ex. data, voice, etc.). The management VLAN is different from the traffic VLAN in that it is dedicated to management and testing of various connections, links and appliances, as will be discussed in greater detail herein below.

A number of VLANs can be aggregated (or encapsulated) into a single VLAN, a concept generally referred to by those of skill in the art as "queue-in-queue" or "stacked VLANs". The VLANs can be aggregated according to the 802.1q standard promulgated by the Institute of Electrical and Electronics Engineers, Inc. and available from http://www.ieee802.org/1/pages/802.1Q.html. For the purposes of the foregoing description, two types of VLANs can be distinguished: a so-called "outer VLAN" and a so-called "inner VLAN". The outer VLANs are network VLANs or stacked VLANs. The outer VLANs are defined consisting of network elements (such as the DSLAM 120, the authorization entity 130, etc.). The outer VLANs are defined to manage data sessions with the Internet, etc. (such as customer data traffic, etc). The inner VLANs are specific to customers and uniquely identify specific customers within the stacked VLAN (or the outer VLAN).

An outer VLAN can be associated with a so-called "outer tag", which uniquely identifies a particular outer VLAN. For the purposes of the architecture discussed with reference to FIG. 1, each outer VLAN has to be associated with a unique outer tag. Each inner VLAN can be associated with a so-called "inner tag", which uniquely identifies a particular inner VLAN. As will be appreciated by those of skill in the art, each inner tag has to be unique within a single outer VLAN, but can be re-used in other outer VLANs. In the aforementioned Lucent Stinger example, each DSLAM 120 can support up to 4096 inner tags per DSLAM 120. As will be further appreciated by those of skill in the art, if a particular DSLAM 120 requires more inner tags, either an additional outer VLAN can be defined or additional hardware (such as an additional blade) can be installed that would give a new range of up to 4096 inner tags.

By binding a particular inner tag to an outer tag, it is manifested that the particular inner VLAN associated with the particular inner tag should be aggregated (or encapsulated) into an outer VLAN that is associated with the particular outer tag. Aggregation (encapsulation) of an inner VLAN into an outer VLAN can be implemented using Inter-Switch Link (ISL) protocol promulgated by Cisco Systems, Inc. of 170 West Tasman Dr., San Jose, Calif., USA. It should be understood that other suitable protocols exists and can be equally used.

The outer tags and inner tags are assigned to members of various VLANs by the VLAN emulation and configuration module 134 when the network is provisioned. Specifically, when a new DSLAM (such as the DSLAM 120) is added to the network, it is provisioned with an outer tag for each VLAN that the particular DSLAM 120 is a member of, and it is provisioned with a range of inner tags (in the aforementioned example of a Lucent Stinger, with a range of 4096 inner tags) which are assigned to customer connections, as they are activated and as will be discussed in greater detail herein below.

With continued reference to FIG. 2, the VLAN emulation and configuration module 134 defines an outer VLAN generally depicted at A. It should be noted that the depiction of the VLAN A is completely hypothetical and logical in nature. In reality, no connections are established, but rather members of a particular VLAN are being associated with the particular VLAN. However, for the purposes of illustration and ease of discussion, the VLAN A and other VLANs discussed herein below have been logically depicted as interconnecting various members of those VLANs. The VLAN A can be defined when the architecture of FIG. 2 is initially provisioned or when new elements (such as a new DSLAM 120) is added to the architecture of FIG. 2.

The VLAN A includes three members—the authorization entity 130, the port 124 of the DSLAM 120 and the port 124*a* of the DSLAM 120*a*. This outer VLAN A is referred to herein below as an "outer traffic VLAN A". The authorization entity 130, the port 124 and the port 124*a* have been provisioned with a token "A" on FIG. 2 to depict their association with the outer traffic VLAN A. Accordingly, the control module 123 records the fact that the port 124 is a member of the outer traffic VLAN A. In a similar manner, the control module 123*a* records the fact that the port 124*a* is a member of the outer traffic VLAN A. The VLAN emulation and configuration module 134 also stores the information about various members of the outer traffic VLAN A (i.e. the authorization entity 130, the port 124 of the DSLAM 120 and the port 124*a* of the DSLAM 120*a*) in the aforementioned internal database. It should be understood, that the outer traffic VLAN A can include a number of additional members (such as, but not limited to the data source 102, the video content source 103, the VoIP device 114, etc.).

In one specific non-limiting example, the VLAN emulation and configuration module 134 can assign to the outer traffic VLAN A an outer tag "10011". It should be appreciated that any suitable outer tag format can be used. The VLAN emulation and configuration module 134 maintains a record of the outer tag assigned to the outer traffic VLAN A in the aforementioned internal database. The VLAN emulation and configuration module 134 also sends an indication of the outer tag associated with the outer traffic VLAN A to the members of the outer traffic VLAN A (i.e. the authorization entity 130, the port 124 of the DSLAM 120 and the port 124*a* of the DSLAM 120*a*). The control modules responsible for the respective members (such as the control module 123 responsible for the port 124) can store this information in association with the outer traffic VLAN A and respective members.

An inner VLAN, logically depicted at B, is associated with the computing apparatus 110. The VLAN B spans two members, namely the port 128 of the DSLAM 120 and the computing apparatus 110. This inner VLAN B is referred to herein below as a "customer specific traffic VLAN B". The customer specific traffic VLAN B can be defined when a subscriber associated with the computing apparatus 110 is provisioned on the network architecture which is depicted on FIG. 2. It will be recalled that the DSLAM 120 can have up to 4096 inner tags available or, in other words, can support up to 4096 customer specific traffic VLANs B. In some embodiments of the present invention, control module 123 can support a database 610 schematically depicted in FIG. 6. The database 610 can maintain a number of records (such as records 620, 622, 624 and 626). Each of the records 620, 622, 624 and 626 can maintain a relationship between a particular port identifier 612 of the DSLAM 120, an inner tag 614 associated with a particular customer specific traffic VLAN (such as the customer specific traffic VLAN B) associated with the particular port identifier 612 and an additional identifier 616 (such as a MAC address or the like) associated with a subscriber premises appliance (such as the computing apparatus 110) or the residential gateway 106 connected to the particular port (such as port 128).

Figure 6:
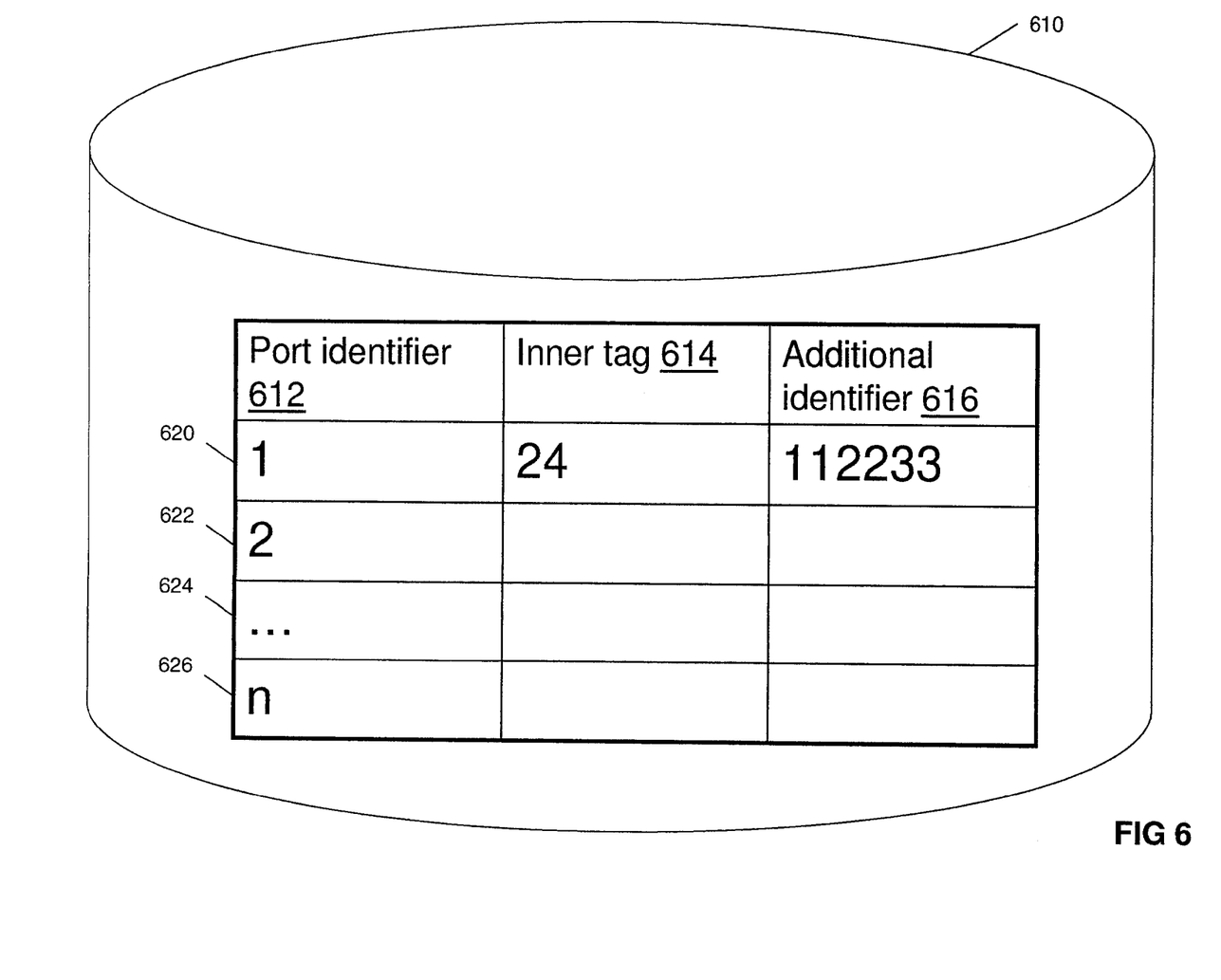
FIG. 6 schematically depicts a database maintained by the DSLAM of FIG. 1.

In a specific example depicted in the record 620, the port identifier 612 dedicated to a specific subscriber can be "1", the inner tag 614 associated with the customer specific traffic VLAN associated with the specific subscriber can be "24" and the additional identifier 616 associated with a subscriber premises appliance associated with the specific subscriber can be "112233". The record 622 may not yet be associated with any specific subscriber and, as such, may not yet be populated. The database can maintain a number of additional records (such as records 624 and 626) that can be substantially similar to the record 620.

When a new subscriber (such as the subscriber associated with the computing apparatus 110) is provisioned onto the network architecture described with reference to FIG. 2, the control module 123 consults the database 610 to ascertain whether there exists an available inner tag. If no such available inner tag exists, exception handling procedure commences, which can involve without limitation sending a notification to a technician to install additional hardware to the DSLAM 120, send a notification to a technician to define an additional outer VLAN, etc.

For the purposes of this discussion, it is assumed that an additional inner tag is available and the next available inner tag is "25". The control module 123 determines that the computing apparatus 110 connects to port 2 and queries the computing apparatus 110 to determine an additional identifier 616, which in this exemplary scenario can be a MAC address "556688c". The control module 123 then assigns an inner tag 25 to the customer specific traffic VLAN B and populates the record 622. The control module 123 further transmits a copy of the record 622 to the VLAN emulation and configuration module 134 for storage thereon.

The computing apparatus 110 and the port 128 have been provisioned with a token "B" on FIG. 2 to depict their association with the customer specific traffic VLAN B.

It will be appreciated that the DSLAM 120 may serve more than one customer premises 104. As will be appreciated by those of skill in the art, an inner VLAN between a port associated with a particular customer premises and an appliance in the particular customer premises needs to be defined and associated with a particular inner tag for each of the particular customer premises, for example an inner tag can be assigned to the residential gateway 106 to support all the traffic (i.e. all the data sessions) coming to the customer premises 104. By the same token, an inner VLAN with each of the different appliances within the customer premises 104 (such as the telephony apparatus 180, the set-top box 112, etc.) can be defined. This can be particularly advantageous, when different customer specific traffic VLANs are defined with different customer premises appliances to distinguish between different types of data sessions. In one specific non-limiting example, different customer specific traffic VLAN can be defined as follows:

- a first customer specific traffic VLAN defined with the computing apparatus 110, the first customer specific traffic VLAN dedicated to data traffic (such as e-mail and web browsing);
- a second customer specific traffic VLAN defined with the set-top box 112 and the computing apparatus 110, the second customer specific traffic VLAN dedicated to video traffic;
- a third customer specific traffic VLAN defined with the telephony apparatus 108 and the computing apparatus 110, the third customer specific traffic VLAN dedicated to voice traffic.

The network architecture depicted in FIG. 2 can be broadly defined as a "traffic mode" architecture. In other words, the architecture of FIG. 2 can support one or more data sessions via one or more traffic VLANs. Specifically, when someone at the customer premises 104 wishes to establish the data session between the computing apparatus 110 and the data source 102 (for instance to browse an Internet resource), a connection needs to be established with the authorization entity 130. In the embodiment illustrated with the reference to FIG. 2, the connection to the authorization entity 130 is established via the outer traffic VLAN A in order to authenticate and authorize user credentials associated with the computing apparatus 110.

Upon the person at the customer premises 104 indicating a desire to establish the data session (for instance, by launching a PPPoE authorization session or the like), a signal is sent to the DSLAM 120 to indicate the desire to establish the data session via the customer specific traffic VLAN B. In one specific non limiting example, the signal indicating the desire of the computing apparatus 110 to initiate the data session can be an Active Discovery Initiation (PADI) packet or any conceivable variant thereof. When the control module 123 receives the signal indicating the desire of the computing apparatus 110 to establish the data session, it queries the database 610 to determine the port identifier 612, the inner tag 614 and the additional identifier 616 associated with the computing apparatus 110.

The control module 123 instructs the bridging entity 121 to bind the inner tag associated with the customer specific traffic VLAN B to the outer tag associated with the outer traffic VLAN A. Effectively, the bridging entity 121 encapsulates the customer specific traffic VLAN B into the outer traffic VLAN A. Specifically, the bridging entity 121 bridges the port 124 (which is a member of the outer traffic VLAN A) and the port 128 (which is a member of the customer specific traffic VLAN B), logically depicted as bridge connection C in FIG. 2.

The control module 123 then generates a broadcast or multicast frame containing the port identifier 612, the inner tag 614 and the additional identifier 616 associated with the computing apparatus 110 and transmits the frame via the outer traffic VLAN A to all members of the outer traffic VLAN A (which in this exemplary scenario includes the authorization entity 130).

As will be appreciated by those of skill in the art, it is possible that any member of the outer traffic VLAN A responds to the PADI packet. For the purposes of illustrating an aspect of this invention, it is assumed that the authorization entity 130 is the one that responds to the PADI packet. In one specific non limiting example, the authorization entity 130 responds with an Active Discovery Offer (PADO) packet or with any conceivable variant thereof. The PADO packet is transmitted via the outer traffic VLAN A. The authorization entity 130 and the control module 123 can exchange a number of additional signals, such as but not limited to an Active Discovery Request (PADR) packet, an Active Discovery Session-confirmation (PADS) packet, etc. at which point, the PPPoE authorization request is effectively "granted" and a point-to-point session is established between the authorization entity 130 and the computing apparatus 110 via the outer traffic VLAN A and the customer specific traffic VLAN B.

Once the PPPoE authorization is successfully completed, the computing apparatus 110 can access any end point via the communication network 112, for instance the data source 102 and the like. As such, it should be clear to one of skill in the art that the "traffic mode" architecture of FIG. 2 allows the computing apparatus 110 to access an end point connected to the communication network 116.

Figure 3:
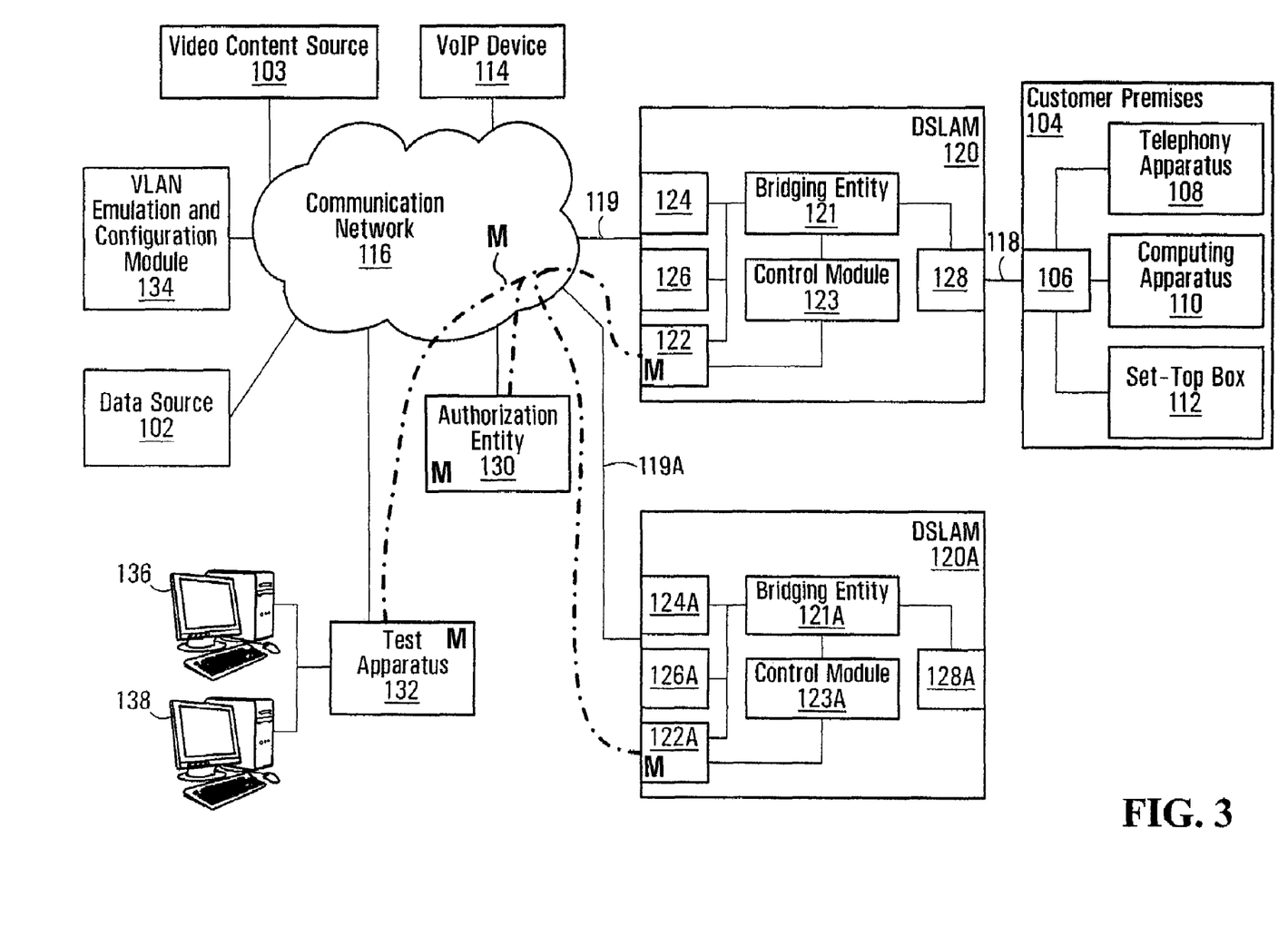
FIG. 3 is a conceptual block diagram depicting the system of FIG. 1 with defined management VLANs between a test apparatus and two DSLAMs.

With reference to FIG. 3, a so-called "management VLAN" is now described. It will be recalled, that the management VLAN is dedicated to supporting one or more "management sessions". An outer management VLAN, logically depicted at M, includes the following members: the authorization entity 130, port 122 of the DSLAM 120, port 122a of the DSLAM 120a and the test apparatus 132. Each of these elements has been provisioned with a token "M" on FIG. 3 to depict their association with the outer management VLAN M. Accordingly, the control module 123 records the fact that the port 122 is a member of the management VLAN M. In a similar manner, the control module 123a records the fact that the port 122a is a member of the management VLAN M. The VLAN emulation and configuration module 134 also stores the information about various members of the management VLAN M (i.e. the authorization entity 130, port 122 of the DSLAM 120, port 122a of the DSLAM 120a and the test apparatus 132) in the aforementioned internal database.

The management VLAN M can be associated with an outer tag, which in one specific non-limiting example can be "4040". It should be understood, that any suitable outer tag format can be used. It should be understood, that the management VLAN M can include a number of other members, such as management ports of other DSLAMs (not depicted), other test apparatuses, other end points connected to the communication network 116 and the like.

The test apparatus 132 can receive at least two types of instructions for performing tests, namely a "customer test instruction" and a "network test instruction". In some embodiments, the test instruction can contain both the customer test instruction and the network test instruction (in case that both tests need to be performed in sequence). Upon determining presence of the customer test instruction and/or the network test instruction, the test apparatus 132 can cause the architecture of FIG. 3 to enter into a customer test mode or a network test mode respectively, as will be discussed herein below.

Figure 4:
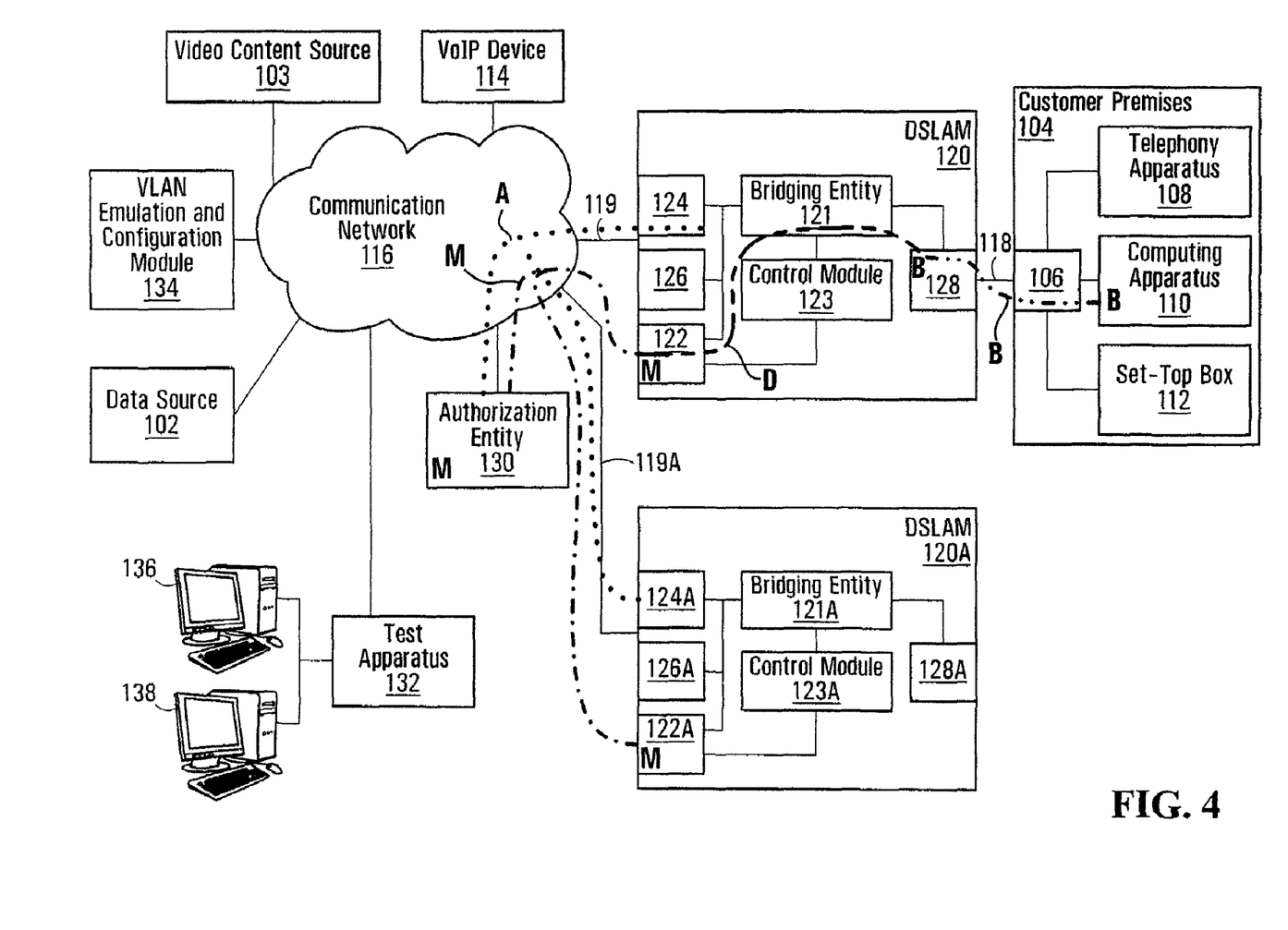
FIG. 4 is a conceptual block diagram depicting system of FIG. 1 in a state of a customer test.

With reference to FIG. 4, an architecture for conducting a so-called "customer test" is described. For the purposes of this discussion, it will be assumed that it is desired to determine certain parameters associated with the delivery of telecommunications services to the customer premises 104. In one specific non-limiting example, it is assumed that quality of the data session terminating at the computing apparatus 110 needs to be determined. Specifically, a throughput test of a network connection terminating at the computing apparatus 110 (ex. the communication link 118) may need to be performed. It is further assumed that the architecture of FIG. 2 is currently applied. In other words the inner tag associated with the customer specific traffic VLAN B is bound to the outer tag associated with the outer traffic VLAN A.

The test apparatus 132 can receive an instruction to perform a customer test associated with the computing apparatus 110 from one of stations 136 or 138. Firstly, the test apparatus 132 determines a specific inner tag associated with the subscriber for whom a customer test is to be performed. In one specific non-limiting example, the test apparatus 132 can maintain a database (not depicted) substantially similar to the database 610. In other words, the information maintained by the test apparatus 132 can be uploaded from the database 610 maintained by the DSLAM 120 (as well as similar databases maintained by other DSLAMs, such as the DSLAM 120a). In addition to information contained in the database 610, the test apparatus 132 can also maintain information representing which particular DSLAM 120 services which subscriber particular premises 104. In an alternative scenario, the test apparatus 132 can query the database 610 maintained by the DSLAM 120 and similar databases maintained by other DSLAMs, such as the DSLAM 120a.

The test apparatus 132 queries the requisite database based on any known parameter, such as the MAC address of the customer premises appliance or a telephone number associated with the subscriber premises 104, to name a few. The test apparatus 132 retrieves (a) an identifier of the DSLAM 120 that services the particular subscriber; (b) an inner tag associated with the particular subscriber and/or any additional identifier (such as an identifier substantially similar to the additional identifier 616, etc). The test apparatus 132 generates an instruction that, among other parameters, identifies which specific inner tag to test and the DSLAM 120 which terminates the network connection to be tested. The test apparatus 132 transmits the instruction to the DSLAM 120 via the management VLAN M. Specifically, the test apparatus 132 generates a broadcast or multicast frame containing the instruction and transmits the frame via the management VLAN M.

The instruction is for indicating to the control module 123 of the DSLAM 120 to unbind the bridge connection C between the inner tag associated with customer specific traffic VLAN B (the inner tag that has been retrieved from the database, as described in the preceding paragraph) and the outer tag associated with the outer traffic VLAN A. Accordingly, the control module 123 instructs the bridging entity 121 to unbind the bridge connection C and to bind the inner tag associated with the customer specific traffic VLAN B to the outer tag associated with the management VLAN M. Specifically, the bridging entity 121 bridges the port 122 and the port 128, depicted as bridge connection D in FIG. 4. Effectively, the bridging entity 121 encapsulates the customer specific traffic VLAN B into the management VLAN M.

At this stage, the computing apparatus 110 is connected to the test apparatus 132 via the management VLAN M and the customer specific traffic VLAN B. The test apparatus 132 can now perform customer specific tests. In one specific, non-limiting example the test apparatus 132 can attempt to establish a PPPoE session with the computing apparatus 110 via the management VLAN M and the customer specific traffic VLAN B. Effectively, the test apparatus 132 mimics the actions that would otherwise be performed by the authorization entity 130. In some embodiments of the present invention, the customer tests can be useful to determine whether incorrect credentials have been used by the computing apparatus 110.

In other embodiments of the present invention, the test apparatus 132 may authorize the credentials presented by the computing apparatus 110 via the PPPoE session no matter what they are. In other words, the test apparatus 130 can artificially "grant" a PPPoE session authorization request based on incorrect, incomplete, expired or otherwise defective credentials. Once the authorization request has been granted, additional customer tests can be performed between the test apparatus 132 and the computing apparatus 110. In some embodiments of the present invention, tests associated with Layer 7 of the OSI Model are conducted.

In one specific non-limiting example a throughput test is conducted. The throughput test can be either upstream or downstream. For the purposes of the downstream throughput test a file of a pre-determined size is downloaded from the test apparatus 132 to the computing apparatus 110. For the purposes of the upstream throughput test a file of a pre-determined size is uploaded from the computing apparatus 110 to the test apparatus 132.

Once all the required tests have been conducted, the test apparatus 132 sends an instruction to the control module 123 to return the DSLAM 120 into the "traffic mode" of FIG. 2. Specifically, the test apparatus 132 generates a broadcast or multicast frame containing the instruction and transmits the frame via the management VLAN M. The test apparatus 132 sends an instruction to the control module 123 to unbind the inner tag associated with the customer specific traffic VLAN B from the outer tag associated with the management VLAN M (i.e. to unbind the bridge connection D). The control module 123 then instructs the bridging entity 121 to bind the inner tag associated with the customer specific traffic VLAN B to the outer tag associated with the outer traffic VLAN A, effectively returning the architecture of FIG. 4 into the traffic mode.

Figure 5:
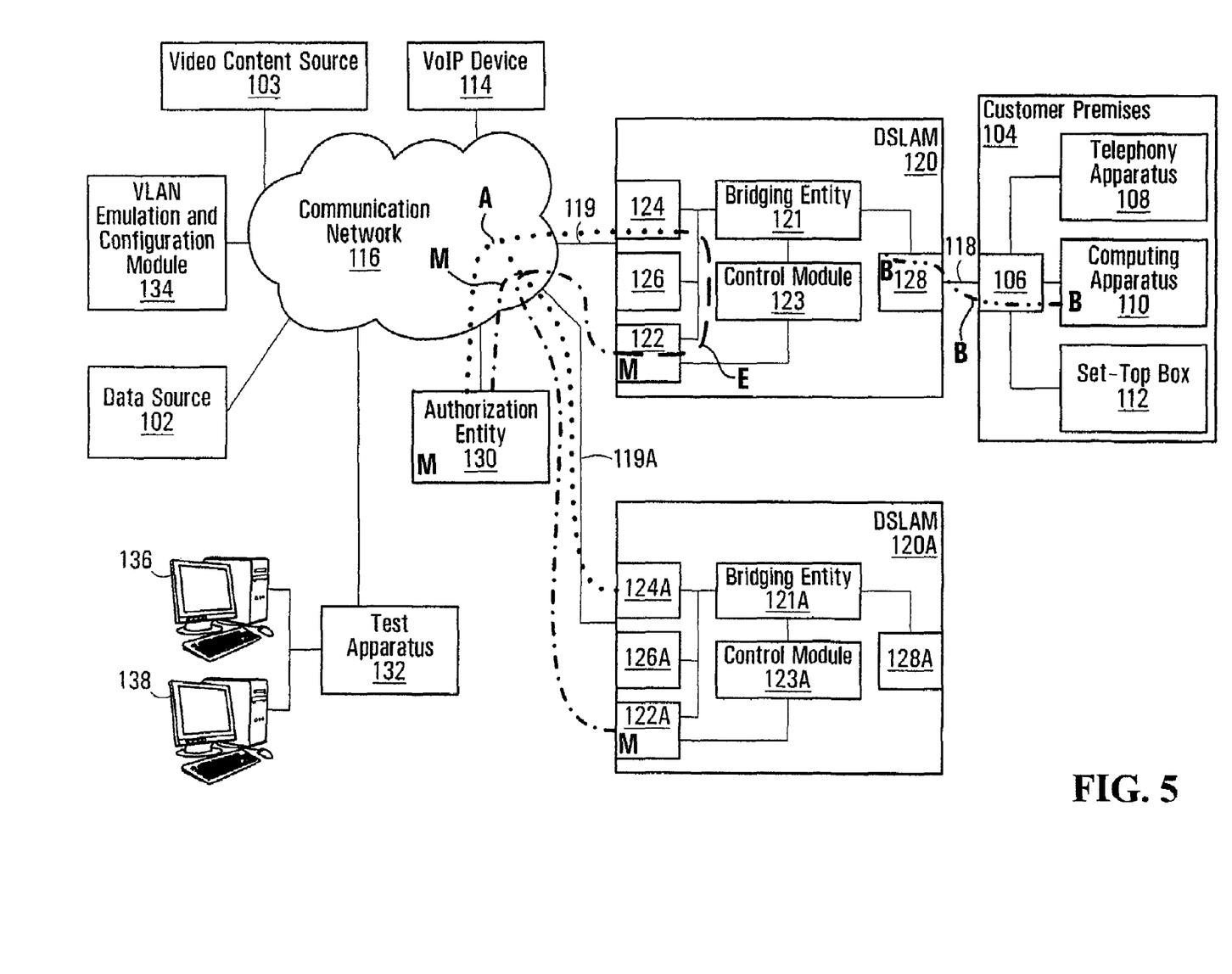
FIG. 5 is a conceptual block diagram depicting system of FIG. 1 in a state of a network test.

With reference to FIG. 5, an architecture for conducting a so-called "network test" is described. In one specific non-limiting example, the network test may be required when someone at the customer premises 104 is experiencing an unsatisfactory level of one or more telecommunication services. For example, someone at the customer premises 104 may be experiencing a problem with the data session terminating at the computing apparatus 110, namely that the data session terminating at the computing apparatus 110 is slow and does not meet a certain standard. Naturally, it should be appreciated that the network test can be performed for a number of other reasons as well. For example, the network test can be performed to determine whether the authorization entity 130 is properly configured.

For the purposes of the discussion, it will be assumed that it is desired to conduct a test to confirm certain parameters about the data session terminating at the computing apparatus 110 (for example, that the data session meets certain standard, such as may pertain to throughput, jitter and the like). It is further assumed that the architecture of FIG. 2 is currently applied. In other words the inner tag associated with the customer specific traffic VLAN B is bound to the outer tag associated with the outer traffic VLAN A.

The test apparatus 132 receives an instruction to perform a network test associated with the computing apparatus 110 from one of the workstations 136 and 138. The test apparatus 132 determines a specific inner tag associated with the subscriber for whom a network test is to be performed in a substantially the same manner as has been discussed above with reference to the customer test.

The test apparatus 132 also generates a so-called "inner management tag". In one specific non-limiting example, the test apparatus 132 generates a "pseudo inner tag", which has to be unique for the duration of the customer test. The test apparatus 132 generates an instruction that, among other parameters, identifies (i) which specific inner tag is associated with the subscriber whose network connections are to be tested; and (ii) the inner management tag of the test apparatus 132 and transmits the instruction to the DSLAM 120 via the management VLAN M. Specifically, the test apparatus 132 generates a broadcast or multicast frame containing the instruction and transmits the frame via the management VLAN M.

The test apparatus 132 instructs the control module 132 to unbind the connection between the inner tag associated with the customer specific traffic VLAN B (the inner tag that has been retrieved from the database, as described in the preceding paragraph) and the outer tag associated with the outer traffic VLAN A (i.e. the bridge connection C). The control module 123 then instructs the bridging entity 121 to bind the outer tag associated with the management VLAN M to the outer tag associated with the outer traffic VLAN A using the inner management tag, which has been generated as described in the preceding paragraph. It will be recalled that the bridging entity 121 can comprise an OC3 trunk module including two ports, which among other things enables binding a first outer tag to a second outer tag or, in other words, to bind two outer VLANs terminating at the same interface (in this case, coming in and coming out to/from the DSLAM 120 or more specifically to/from the bridging entity 121). It will be recalled, that the two ports of the OC3 trunk module can be conveniently hard wired by a fiber patch therebetween. As such, the bridging entity 121 is operable to bridge the first outer VLAN (i.e. the management VLAN M) which in this example includes the first port of the OC3 trunk module to the second outer VLAN (i.e. the outer traffic VLAN A) which in this example includes the second port of the OC3 trunk module. Specifically, the bridging entity 121 bridges the port 122 and the port 124, depicted as a bridge connection E in FIG. 5.

At this stage, the test apparatus 132 is connected to the authorization entity 130 via the management VLAN M using a "path" that would have been followed by the data session that would otherwise terminate on the computing apparatus 110. In other words, the test apparatus 132 pretends to be the computing apparatus 110. The test apparatus 132 can now perform network tests. In one specific non limiting example, the test apparatus 132 can attempt to establish a PPPoE session to authorize user credentials associated with the computing apparatus 110. The test apparatus 132 can obtain the user credentials from the customer service representatives/technician working at one of workstations 136 and 138. The customer service representatives/technician, in turn, may obtain the user credentials from someone who reports an issue at the subscriber premises 104.

Effectively, the test apparatus 132 mimics the actions that would otherwise be performed by the computing apparatus 110. This type of network test can be particularly advantageous to determine whether the computing apparatus (or the subscriber associated with the computing apparatus 110) presents wrong, incomplete, expired or otherwise defective credentials and these defective credentials result in issues with network connections associated with the particular subscriber whose network connections are under test.

In another embodiment, the test apparatus 132 can present a set of so-called "management credentials" or, in other words, a set of pre-defined credentials. If the authorization entity 130 does not authorize the management credentials, the test apparatus 132 can provide an indication of the authorization entity 130 being mis-configured to a customer service representative/technician via one of the workstations 136 and 138. This type of network test can be advantageous to determine mis-configuration issues associated with the authorization entity 130.

At this stage, a number of additional network tests can be performed between the test apparatus 132 and an end point connected to the communication network 116, such as the data source 102 or an alternative end point. In some embodiments of the present invention, tests associated with Layer 7 (Application Layer) of the OSI Model parameters are conducted. In one specific non-limiting example a throughput test is conducted.

Once all the required tests have been conducted, the test apparatus 132 sends an instruction to return the DSLAM 120 into the "traffic mode" of FIG. 2. Specifically, the test apparatus 132 generates a broadcast or multicast frame containing the instruction and transmits the frame via the management VLAN M. The test apparatus 132 sends an instruction to the control module 123 to unbind the outer tag associated with the outer traffic VLAN A from the outer tag associated with the management VLAN M (i.e. unbind the bridge connection E). The control module then instructs the bridging entity 121 to bind the inner tag associated with the customer specific traffic VLAN B to the outer tag associated with the outer traffic VLAN A.

Irrespective of what kind of tests is conducted, the test apparatus 132 can collect and analyze the test results. In some embodiments of the present invention, the test results can be presented to the customer service representative working at one of the workstations 136 and 138 for perusal and conveyance to the member of the customer premises 104 who has reported the issue. Alternatively, the customer service representative working at one of the workstations 136 and 138 can peruse the test results and take further corrective actions to remedy any connection issues found in the test results. Such corrective actions can include dispatching a repair team to the customer premises 104 or any other appropriate corrective action. Alternative corrective actions can include dispatching a repair team to the DSLAM 120 or any other appropriate corrective action. The instant invention can enable the customer service representative/technician working at one of the workstations 136, 138 to determine (a) whether it is required to dispatch a team; and (b) if yes, where to send the team to (ex. the customer premises 104, the DSLAM 120, the authorization entity 130, etc.). In some embodiments, if the test results indicate that the authorization entity 130 is mis-configured, the corrective action can include properly configuring the authorization entity 130.

It should be noted that the teachings of this invention apply to testing any portion of the network connection. For example, in the aforementioned scenario where the DSLAM 120 is distributed with a first segment located in the central office and at least one second segment located in an outside location; the first segment can be defined as a member of a first VLAN and the second segment can be defined as a member of the second VLAN. As such, the teachings of this invention would enable testing the network connection between the first segment and the second segment by selectively bridging the first VLAN and the second VLAN to the aforementioned management VLAN to conduct tests along the appropriate portion of the network connection to/from the first or the second segments.

Even though the foregoing description of the invention has been based on an exemplary scenario where the access control entity comprises the DSLAM 120, one skilled in the art will readily appreciate that teachings of this invention can be applied to other types of communication networks 116 and other types of access control entities.

For example, in the aforementioned scenario where the communication network 116 comprises a coaxial cable based communication network, the access control entity can comprise one or more head end modems. In this scenario, the one or more head end modems can be defined as member(s) of the outer traffic VLAN A and the management VLAN M, as appropriate. In this scenario, the teachings of this invention can be used to test the network connection traversing the coaxial cable based communication network.

By the same token, in the aforementioned scenario where the communication network 116 comprises a WiMax-based communication network, the access control entity can comprise one or more wireless transmission nodes, commonly referred to as base stations. In this scenario, the base stations can be defined as members of the outer traffic VLAN A and the management VLAN M, as appropriate. The inner VLANs can be assigned to customer connections based on frequency, time, etc. In this scenario, the teachings of this invention can be used to test the network connection traversing the WiMax based communication network.

Those skilled in the art will appreciate that in some embodiments, certain functionality of the test apparatus 132 and/or the DSLAM 120 (including the VLAN bridging entity 121 and the control module 123) may be implemented as pre-programmed hardware or firmware elements (e.g., application specific integrated circuits (ASICs), electrically erasable programmable read-only memories (EEPROMs), etc.), or other related components. In other embodiments, the test apparatus 132 and/or the DSLAM 120 (including the VLAN bridging entity 121 and the control module 123) may comprise an arithmetic and logic unit (ALU) having access to a code memory (not shown) which stores program instructions for the operation of the ALU in order to execute the various processes described above. The program instructions could be stored on a medium which is fixed, tangible and readable directly by the test apparatus 132 and/or the DSLAM 120 (including the VLAN bridging entity 121 and the control module 123)), (e.g., removable diskette, CD-ROM, ROM, or fixed disk), or the program instructions could be stored remotely but transmittable to the test apparatus 132 and/or the DSLAM 120 (including the VLAN bridging entity 121 and the control module 123) via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Persons skilled in the art will appreciate that there are yet more alternative implementations and modifications possible for implementing the present invention, and that the above implementations and examples are only illustrations of one or more embodiments of the present invention. The scope of the invention, therefore, is only to be limited by the claims appended hereto.

What is claimed is:

1. An apparatus suitable for enabling testing of a connection defined between a customer entity and a network entity, the apparatus comprising:
    a first interface adapted to exchange with the network entity data associated with the connection over a first traffic VLAN;
    a second interface adapted to exchange with the customer entity data associated with the connection over a second traffic VLAN bridged to the first traffic VLAN by a bridging entity;
    a third interface adapted to exchange with a management entity data associated with a management connection over a management VLAN; and
    a control module coupled to the first, second and third interfaces, the control module operable to respond to an instruction received from the management entity to cause the bridging entity to perform selective bridging of the management VLAN to at least one of the first traffic VLAN and the second traffic VLAN.

2. The apparatus defined in claim 1, wherein the at least one instruction is received over the management VLAN.

3. The apparatus defined in claim 2, wherein said instruction is received as part of one of a broadcast frame and a multicast frame.

4. The apparatus defined in claim 1, wherein said instruction comprises at least one of a network test instruction and a customer test instruction.

5. The apparatus defined in claim 1, wherein control module is operable to cause the bridging entity to perform selective bridging of the management VLAN to either the first traffic VLAN or the second traffic VLAN.

6. The apparatus defined in claim 1, wherein the first traffic VLAN is characterized by an outer VLAN tag.

7. The apparatus defined in claim 6, wherein the second traffic VLAN is characterized by an inner VLAN tag.

8. The apparatus defined in claim 7, the outer VLAN tag of the first VLAN being a first outer VLAN tag, wherein the management VLAN is characterized by a second outer VLAN tag different from the first outer VLAN tag.

9. The apparatus defined in claim 8, said instruction comprising a customer test instruction, wherein the control module is operable to respond to the customer test instruction to cause the bridging entity to bind the inner VLAN tag to the second outer VLAN tag.

10. The apparatus defined in claim 8, said instruction comprising a network test instruction, wherein the control module is operable to respond to the network test instruction to cause the bridging entity to bind the first outer VLAN tag to the second outer VLAN tag.

11. The apparatus defined in claim 10, wherein the control module is operable to cause the bridging entity to bind the first outer VLAN tag to the second outer VLAN tag using the inner VLAN tag.

12. The apparatus defined in claim 1, wherein said second interface is for connection to a copper twisted pair.

13. The apparatus defined in claim 12, wherein said second interface comprises a port dedicated to the customer entity.

14. The apparatus defined in claim 1, wherein said third interface comprises a dedicated management port.

15. The apparatus defined in claim 1, further comprising a fourth interface adapted to exchange with a second customer entity data associated with a connection over a third traffic VLAN bridged to the first traffic VLAN by said bridging entity, said third traffic VLAN associated with the second customer entity.

16. The apparatus defined in claim 15, wherein:
the second traffic VLAN is characterized by a first inner VLAN tag; and
the third traffic VLAN is characterized by a second inner VLAN tag different from said first inner VLAN tag.

17. The apparatus defined in claim 1, embodied in a digital subscriber line access multiplexer (DSLAM).

18. The apparatus defined in claim 1, embodied in a cable head-end modem.

19. The apparatus defined in claim 1, embodied in a wireless transmission node.

20. The apparatus defined in claim 1, further comprising said bridging entity.

21. A method for testing a customer connection defined between a customer entity and a network entity; the method executable at an apparatus, the apparatus connectable to at least a portion of said connection; the method comprising:
receiving an instruction over a management VLAN, said management VLAN for exchanging with a management entity data associated with a management connection;
attempting to detect within said instruction at least one of a network test instruction and a customer test instruction;
responsive to detection of said network test instruction, bridging a first traffic VLAN to said management VLAN for performing at least one network test along said customer connection; and
responsive to detection of said customer test instruction, bridging a second traffic VLAN to said management VLAN for performing at least one customer test along said customer connection.

22. The method defined in claim 21, wherein
said first traffic VLAN is characterized by an outer tag; and
wherein said management VLAN is characterized by an outer management tag; and
wherein said bridging a first traffic VLAN to said management VLAN comprises bridging said outer tag to said outer management tag.

23. The method defined in claim 22, wherein said bridging said outer tag to said outer management tag comprises bridging said outer tag to said outer management tag using a management inner tag.

24. The method defined in claim 23, further comprising receiving from said management entity via said management VLAN an indication of said management inner tag.

25. The method of claim 21, wherein responsive to detection of said network test instruction, the method further comprising attempting to establish a PPPoE session between said management entity and said network entity via said first traffic VLAN bridged to said management VLAN.

26. The method defined in claim 21, wherein said performing at least one network test comprises performing at least one Layer 7 test.

27. The method defined in claim 21, wherein
said second traffic VLAN is characterized by an inner tag; and
wherein said management VLAN is characterized by an outer management tag; and
wherein said bridging a second traffic VLAN to said management VLAN comprises bridging said inner tag to said outer management tag.

28. The method defined in claim 27, further comprising receiving from said management entity via said management VLAN an indication of said inner tag.

29. The method of claim 21, wherein responsive to detection of said customer test instruction, the method further comprising attempting to establish a PPPoE session between said management entity and said customer entity via said second traffic VLAN bridged to said management VLAN.

30. The method defined in claim 21, wherein said performing at least one customer test comprises performing at least one Layer 7 test.

31. A system comprising:
a management entity coupled to a connection defined between a customer entity and a network entity; and
an access control entity connectable to said connection;
the access control entity comprising:
a first interface adapted to exchange with the network entity data associated with the connection over a first traffic VLAN;
a second interface adapted to exchange with the customer entity data associated with the connection over a second traffic VLAN bridged to the first traffic VLAN by a bridging entity;
a third interface adapted to exchange with the management entity data associated with a management connection over a management VLAN; and
a control module coupled to the first, second and third interfaces, the control module operable to respond to an instruction received from the management entity to cause the bridging entity to perform selective bridging of the management VLAN to at least one of the first traffic VLAN or the second traffic VLAN.

32. The system defined in claim 31, wherein said control module is operable to cause said bridging entity to perform selective bridging of the management VLAN to either the first traffic VLAN or the second traffic VLAN.

33. The system defined in claim 31, further comprising a second access control entity; said second access control entity including a fourth interface adapted to exchange with the management entity data associated with a second management connection over said management VLAN.

34. The system defined in claim 33, wherein said second access control entity comprises a fifth interface adapted to exchange with the network entity data associated with a second connection over said first traffic VLAN.

35. The system defined in claim 34, wherein said second access control entity comprises a sixth interface adapted to exchange with a second customer entity data associated with said second connection over a third traffic VLAN bridged to the first traffic VLAN by said bridging entity.

36. The system defined in claim 35, wherein said third traffic VLAN is dedicated to said second customer entity.

37. The system defined in claim 31, further comprising at least one workstation coupled to said management entity for controlling said management entity.

38. The system defined in claim 37, wherein said at least one workstation is remotely coupled to said management entity.

39. The system defined in claim 37, wherein a user at said at least one workstation is operable:
to receive an indication of a characteristic associated with the connection from said customer entity; and
responsive to receipt of an indication, to generate said instruction.

40. The system defined in claim 31, wherein said access control entity comprises a digital subscriber line access multiplexer (DSLAM).

41. The system defined in claim 31, wherein said access control entity comprises a cable head-end modem.

42. The system defined in claim 31, wherein said management entity comprises a test apparatus.

43. The system defined in claim 31, wherein said network entity comprises one of an authorization entity and an address assigning entity.

44. The system defined in claim 43, wherein said authorization entity comprises an Authentication, Authorization and Accounting (AAA) server.

45. The system defined in claim 43, wherein said address assigning entity comprises a Dynamic Host Configuration Protocol (DHCP) server.

46. The system defined in claim 31, wherein said second interface comprises a port dedicated to the customer entity.

47. The system defined in claim 31, wherein said third interface comprises a dedicated management port.

48. A management entity suitable for testing a connection defined between a customer entity and a network entity, the connection traversing at least one access control entity; the management entity comprising:
a first interface adapted to exchange with at least one of said customer entity, said network entity and at least one access control entity data associated with a management connection over a management VLAN;
a control module coupled to said first interface, said control module operable to:
generate an instruction, said instruction comprising at least one of a network test instruction and a customer test instruction;
transmit said instruction to said at least one access control entity over said management VLAN, said instruction being instrumental in causing said access control entity to selectively bridge said management VLAN to one of a first traffic VLAN and a second traffic VLAN, said first traffic VLAN for exchanging with the network entity data associated with the connection and said second traffic VLAN for exchanging with the customer entity data associated with the connection when the second traffic VLAN is bridged to the first traffic VLAN by the control module.

49. The management entity defined in claim 48, wherein said control module is operable to receive an indication of a characteristic of said connection, and to generate an instruction only responsive to receipt of said indication.

50. The management entity defined in claim 49, wherein said indication of a characteristic is indicative of at least one problem experienced by said customer entity with the connection.

51. A method for testing a customer connection defined between a customer entity and a network entity; the method executable at an apparatus, the apparatus connectable to at least a portion of said connection; the method comprising:
receiving a customer test instruction over a management VLAN, said management VLAN for exchanging with a management entity data associated with a management connection; and
responsive to said receiving, bridging a second traffic VLAN to said management VLAN for performing at least one customer test along said customer connection.

52. The method of claim 51, further comprising attempting to establish a PPPoE session between said management entity and said customer entity via said second traffic VLAN bridged to said management VLAN.

53. The method defined in claim 51, wherein said performing at least one customer test comprises performing at least one Layer 7 test.

54. The method defined in claim 51, further comprising:
receiving a network test instruction over a management VLAN, said management VLAN for exchanging with a management entity data associated with a management connection; and
responsive to said receiving a network test instruction, bridging a first traffic VLAN to said management VLAN for performing at least one network test along said customer connection.

55. A method for testing a customer connection defined between a customer entity and a network entity; the method executable at an apparatus, the apparatus connectable to at least a portion of said connection; the method comprising:
receiving a network test instruction over a management VLAN, said management VLAN for exchanging with a management entity data associated with a management connection; and
responsive to said receiving, bridging a first traffic VLAN to said management VLAN for performing at least one network test along said customer connection.

56. The method defined in claim 55, further comprising attempting to establish a PPPoE session between said management entity and said network entity via said first traffic VLAN bridged to said management VLAN.

57. The method defined in claim 55, wherein said performing at least one network test comprises performing at least one Layer 7 test.

58. The method defined in claim 55, further comprising:
receiving a customer test instruction over a management VLAN, said management VLAN for exchanging with a management entity data associated with a management connection; and
responsive to said receiving a customer test instruction, bridging a second traffic VLAN to said management VLAN for performing at least one customer test along said customer connection.

* * * * *